(12) United States Patent
Lopez-Barquilla et al.

(10) Patent No.: US 7,711,551 B2
(45) Date of Patent: May 4, 2010

(54) STATIC ANALYSIS TO IDENTIFY DEFECTS IN GRAMMARS

(75) Inventors: Ricardo Lopez-Barquilla, Redmond, WA (US); Craig Campbell, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1214 days.

(21) Appl. No.: 11/151,576

(22) Filed: Jun. 13, 2005

(65) Prior Publication Data

US 2006/0282267 A1 Dec. 14, 2006

(51) Int. Cl.
*G06F 17/27* (2006.01)
*G10L 11/00* (2006.01)
*G10L 21/00* (2006.01)

(52) U.S. Cl. .................. 704/9; 704/270.1; 704/275
(58) Field of Classification Search .............. 704/9, 704/270.1
See application file for complete search history.

(56) References Cited

U.S. PATENT DOCUMENTS

| 5,677,835 | A | 10/1997 | Carbonell et al. ............. 704/8 |
| 5,812,863 | A * | 9/1998 | Ishikawa .................... 715/257 |
| 6,684,201 | B1 * | 1/2004 | Brill .......................... 706/45 |
| 2002/0032549 | A1 * | 3/2002 | Axelrod et al. ................ 703/2 |
| 2004/0093567 | A1 * | 5/2004 | Schabes et al. ............ 715/533 |
| 2006/0041427 | A1 | 2/2006 | Yegnanarayanan et al. .. 704/235 |

OTHER PUBLICATIONS

U.S. Appl. No. 11/150,986, filed Jun. 13, 2005, "Static Analysis of Grammars".

* cited by examiner

*Primary Examiner*—David R Hudspeth
*Assistant Examiner*—Justin W Rider
(74) *Attorney, Agent, or Firm*—Joseph R. Kelly; Westman, Champlin & Kelly, P.A.

(57) ABSTRACT

The present invention provides static analysis of speech grammars prior to the speech grammars being deployed in a speech system.

16 Claims, 9 Drawing Sheets

STATIC ANALYSIS TO IDENTIFY DEFECTS IN GRAMMARS

BACKGROUND

Many modern speech recognition systems use a restrictive language specification, such as a context free grammar (CFG). These grammars are powerful enough to describe most of the structure in spoken language, but also restrictive enough to allow efficient recognition and to constrain the search space.

Such grammars are an integral part of the speech system in that they are closely tied to the underlying technology in the speech system. Therefore, the grammars are a critical factor in determining the quality of service that is delivered by the speech system.

The worldwide web consortium (W3C) has defined an industry standard XML format for speech grammars. Some examples include:

EXAMPLE 1

```
<grammar>
    <rule id="Hello">
        <item>Hello World</item>
    </rule>
</grammar>
```

This grammar consumes the sentence "Hello world." and rejects everything else.

EXAMPLE 2

```
<grammar>
    <rule id="YesOrNo">
        <one-of>
            <item>Yes</item>
            <item>No</item>
        </one-of>
    </rule>
</grammar>
```

This grammar consumes either the word "yes" or the word "no" and rejects everything else.

These examples are provided simply in order to illustrate some parts of the industry standard XML format for speech grammars which has been defined by the W3C. While these are very simple examples, typical grammar libraries and grammars are very complex and rich, and have a very deep structure. Thus, authoring grammars can be a very complicated process, often requiring specialized linguists and detailed domain logic, in order to balance natural interaction with system performance.

Today, the process of building a grammar requires a great deal of time and effort in coding the grammar. Even though today's grammar authors typically use advanced graphical tools and re-usable grammar libraries to minimize development time and to maximize the chance for success, many current speech recognition systems are not robust due to the numerous difficulties involved in the grammar authoring process. Such areas of difficulty in authoring grammars involve identifying unusual words, and over and under generalization, as well as the grammar authors often being generally unfamiliar with the internal workings of the speech recognition engine or other speech system with which the grammar is to be used.

Thus, building a grammar requires a great deal of resources in order to analyze results from the grammar and attempt to identify problems. Once the problems are identified, it also takes a large amount of time and effort in order to attempt to rewrite the grammar to fix those problems. However, because the analysis techniques involved in developing the grammar, pre-deployment, are not in themselves very effective in identifying problems, grammars today are conventionally put online even though they still contain a number of problems.

In order to address these problems, some grammar authors today place heavy reliance on costly post-deployment grammar tuning. In other words, once the grammars are on-line, and are actually being used by users, the users run into problems in deploying the grammar and using it. The users then report problems with the speech recognition system, or the grammar, typically in terms of performance or accuracy. The speech recognition systems simply do not work well and the users of those systems, or those developing around those systems, report back to the speech recognition system developers the problems which have been encountered.

A great majority of these problems have typically involved problems with the grammar. At this point in the process, however (post-deployment) it can be a very painful and costly process to identify and fix the problems in the grammar that are causing problems in the overall performance, or accuracy of the speech recognition system.

SUMMARY

Static analysis is performed on speech grammars prior to the speech grammars being deployed in a speech system. Such grammars may be deployed in a speech recognition system or another type of speech-related system.

In one embodiment, specific static analysis techniques are is performed by plug-in defect identifier components, each of which looks for a different type of error in the grammar. Such defects can include, for example, over-generation, acoustic confusability, spelling and pronunciation, and grammar defects.

DETAILED DESCRIPTION

The present invention deals with performing static analysis on speech grammars. However, before describing the present invention in greater detail, one illustrative environment in which the present invention can be deployed will be described.

Figure 1:
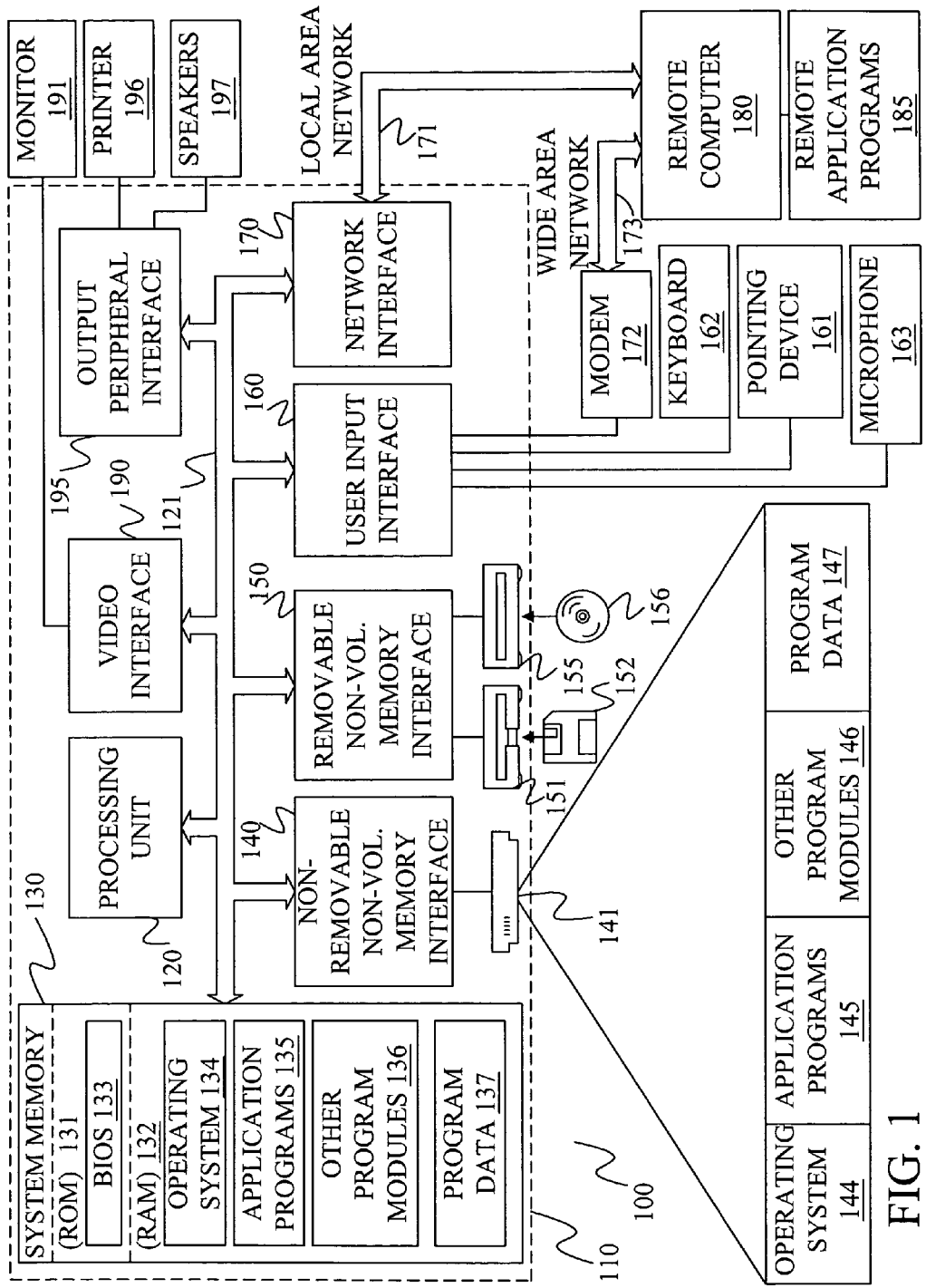
FIG. 1 is a block diagram of one illustrative computing environment in which the present invention can be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
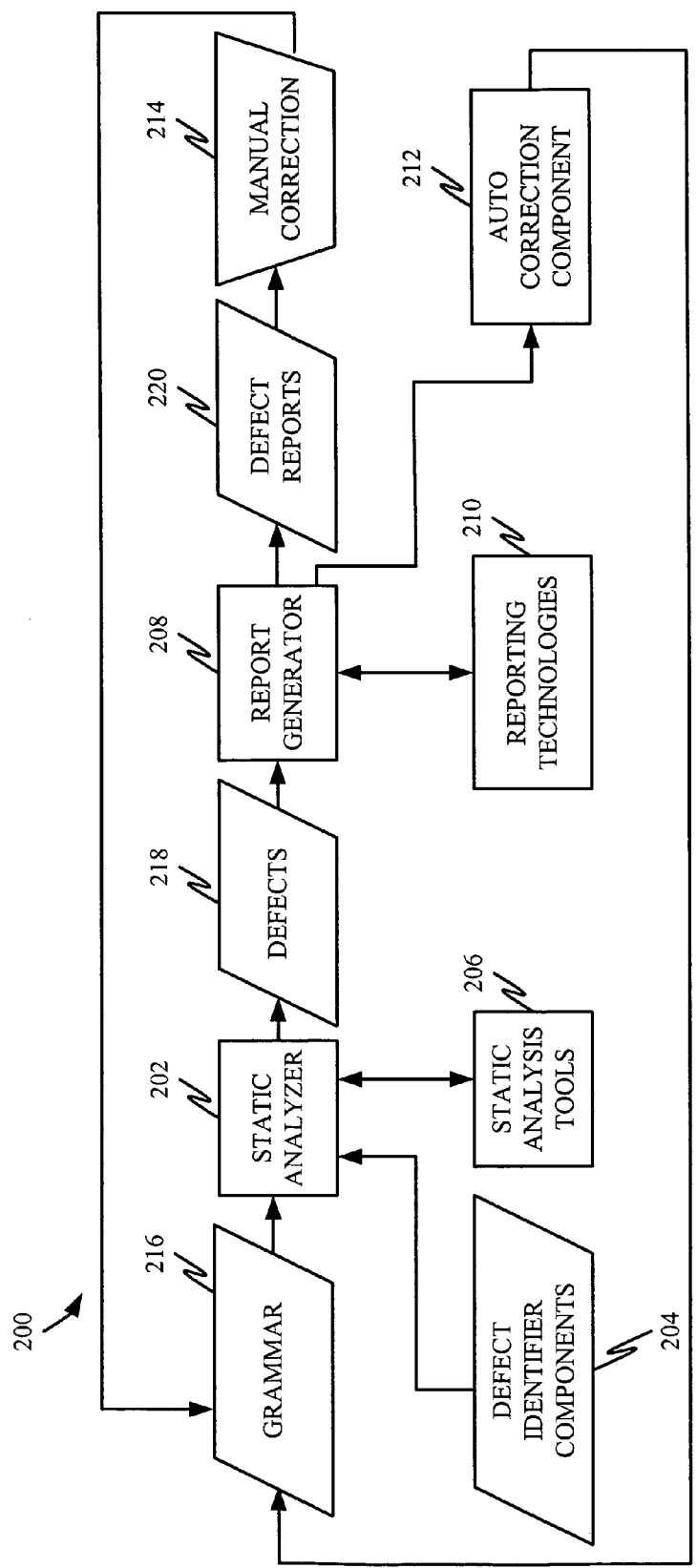
FIG. 2 is a more detailed block diagram of a static analysis system in accordance with one embodiment of the present invention.

FIG. 2 is a block diagram of a static analysis system 200 in accordance with one embodiment of the present invention. System 200 includes static analyzer 202 which is shown having access to defect identifier components 204 and static analysis tools 206. System 200 is also shown having an optional report generator 208 which has access to reporting technologies 210. In addition, system 200 is shown with an optional auto correction component 212 and a manual correction component 214.

Figure 3:
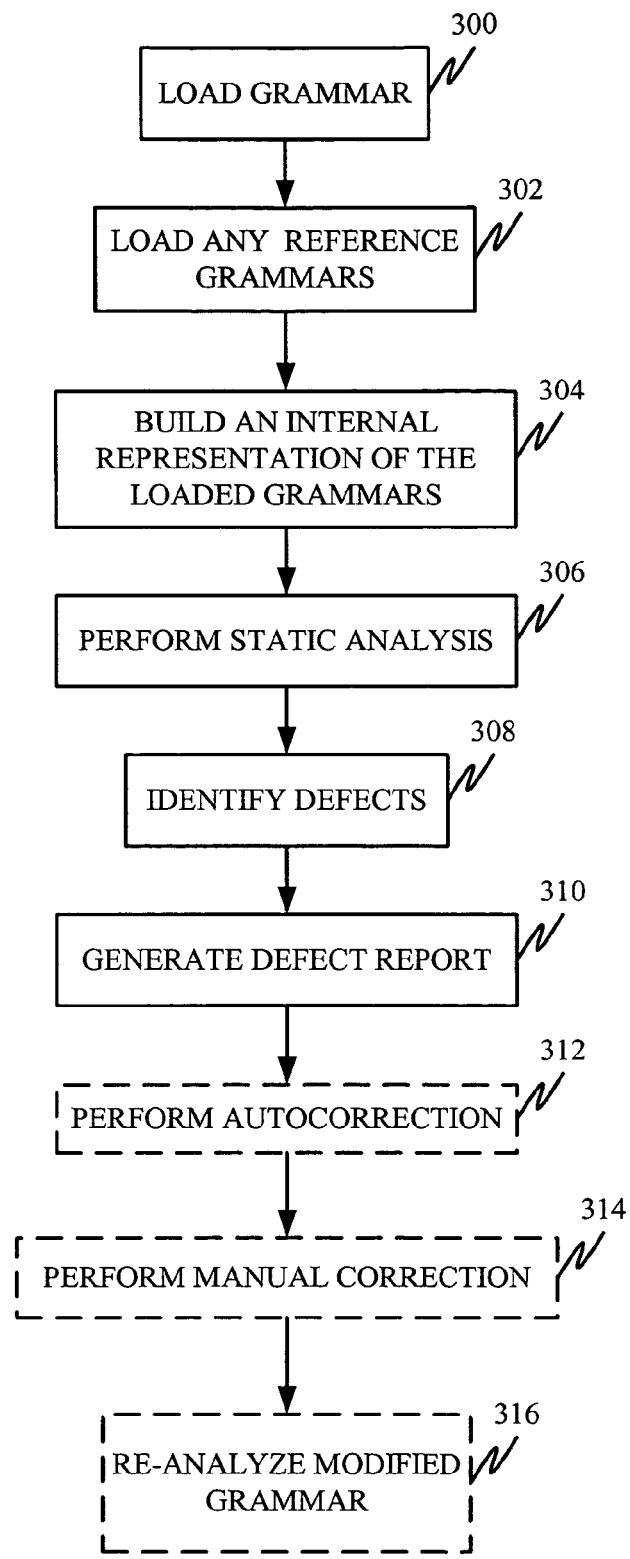
FIG. 3 is a flow diagram illustrating the overall operation of the system shown in FIG. 2.

FIG. 3 is a flow diagram which illustrates the overall operation of system 200 shown in FIG. 2. Static analyzer 202 first loads a grammar 216 which is to be analyzed. This is indicated by block 300 in FIG. 3. One exemplary grammar 216 is a context free grammar. It is not uncommon for a context free grammar to refer to other grammars. Therefore, static analyzer 202 then loads any reference grammars as indicated by block 302 in FIG. 3.

Once the grammar 216 and any reference grammars are loaded, static analyzer 202 builds an internal representation of grammar 216 and any reference grammars. This is indicated by block 304 in FIG. 3.

The exact details of loading the grammar and mapping it to internal data structures will vary based on the system performing the analysis and depending on grammar format (such as the W3C XML format, manufacturers' specific binary formats, BNF, etc.). It should also be noted that the task of loading the grammar can be shared with other systems when static analysis is combined with another system, such as a grammar compiler. Integrating the functions of static analysis into a grammar compiler is shown in FIG. 4A. Of course, they can also be incorporated into a grammar authoring tool as shown in FIG. 4B.

Static analyzer 202 then performs static analysis on the loaded grammar and reference grammars, which are represented by their internal representations. This is indicated by block 306 in FIG. 3. By static analysis, it is meant that the grammar is not placed on-line and deployed, with the analysis being based on the dynamic, deployed operation of the grammar, but instead the analysis is based on off-line analysis of the grammar. In performing that analysis, static analyzer 202 illustratively uses the defect identifier components 204 available to it. In one illustrative embodiment, each defect identifier component 204 is an analysis algorithm or module that analyzes the grammar for a given defect. In doing so, the defect identifier components 204 may illustratively require access to static analysis tools 206. Tools 206 are illustratively those tools which can be used by the various defect identifier components 204 to identify defects. For instance, in one illustrative embodiment, one of the defect identifier components 204 is a spell checker and one of the static analysis tools 206 used by the spell checker is a dictionary or other lexicon.

The defect identifier components 204 and static analysis tools 206 are described in greater detail below with respect to FIG. 4. In any case, once static analyzer 202 performs the static analysis on the grammar, static analyzer 202 identifies one or more defects 218 in the grammar. The defects identified can be substantially any defect for which a defect identifier component 204 is employed. For instance, some defects can be caused by user errors (such as syntax and consistency errors); spelling and pronunciation errors; and semantic results generation errors. Errors can also be system limitations that need to be observed, such as over-generation errors, acoustic confusability errors, and performance enhancement errors. The defects are identified as indicated by block 308 in FIG. 3, and they are provided to report generation component 208.

Report generation component 208 illustratively generates a defect report which identifies each of the defects and, where appropriate, suggests a change or modification to the grammar that will lead to an improvement or elimination of the defect. Report generation component 208 can access any of a wide variety of different reporting technologies 210 in order to generate defect report 220. Generating the defect report is indicated by block 310 in FIG. 3.

In one illustrative embodiment, auto correction component 212 and manual correction component 214 are both provided in system 200. Where static analyzer 202 is highly confident that it has correctly identified a defect, it can, in many cases, automatically correct the defect with auto correction component 212. For instance, where static analyzer 202 has identified a misspelled word with a high degree of confidence, it can automatically correct the spelling of the word with auto correction component 212. Performing auto correction is illustrated by block 312 in FIG. 3.

Manual correction component 214 will illustratively be any type of grammar authoring or editing component which can be used to modify the grammar under analysis. In such an embodiment, the user of manual correction component 214 can simply view the defect report 220 and take any desired corrective action in order to modify the grammar to eliminate or minimize the reported defects. Performing manual correction is indicated by block 314 in FIG. 3. Blocks 312 and 314 in FIG. 3 are shown in dashed lines because they are optional and both need not be provided in any given system.

Once corrective action has been taken (either manually or automatically) the modified grammar is fed back through static analyzer 202 and the modified grammar is re-analyzed. This is indicated by block 316 in FIG. 3. It will be noted, of course, that the static analysis can be performed recursively until no further defects are identified or until a defect threshold is reached or until otherwise terminated.

Figure 4:
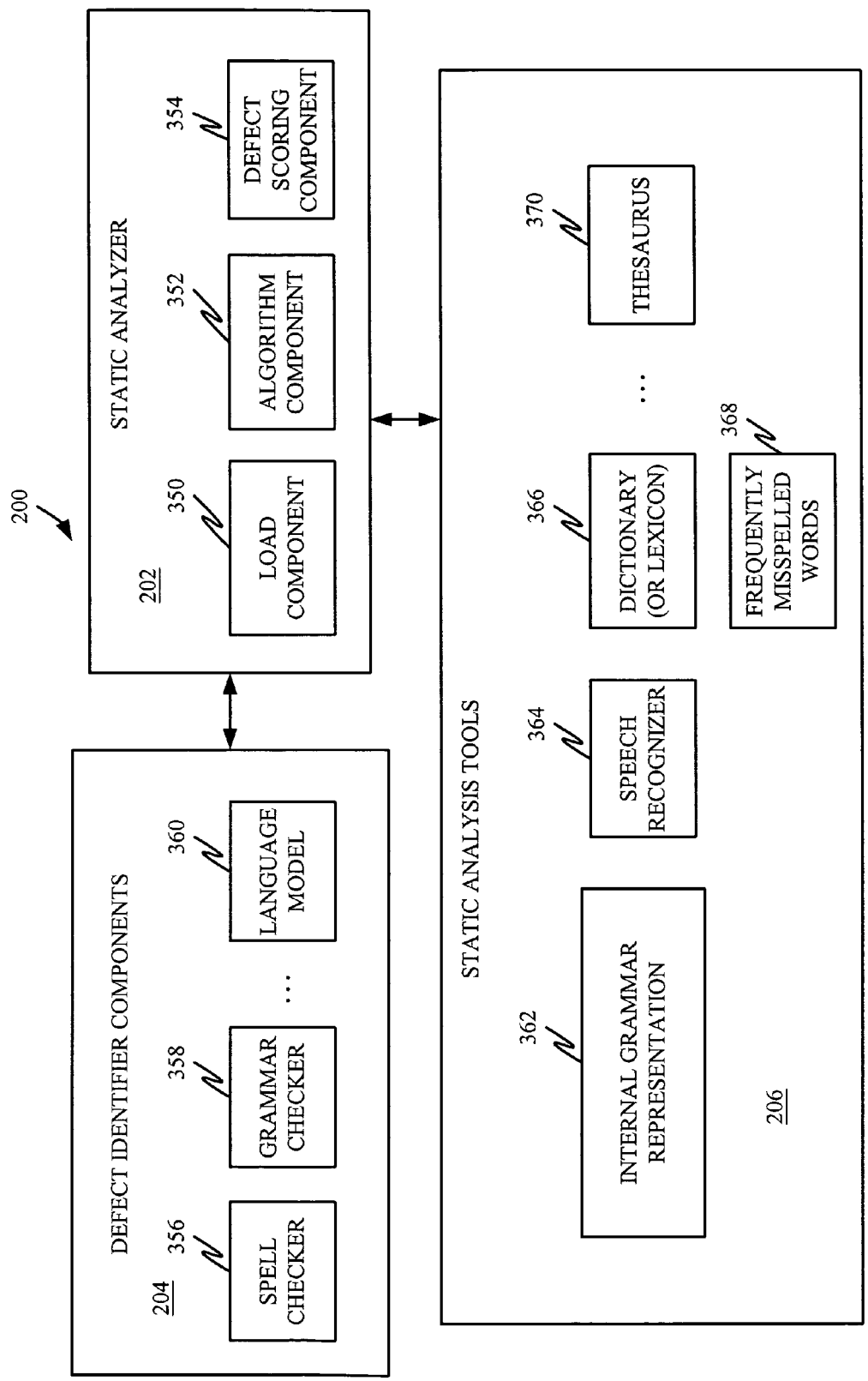
FIG. 4 is a more detailed block diagram of the static analyzer shown in FIG. 2.
Figure 4A:
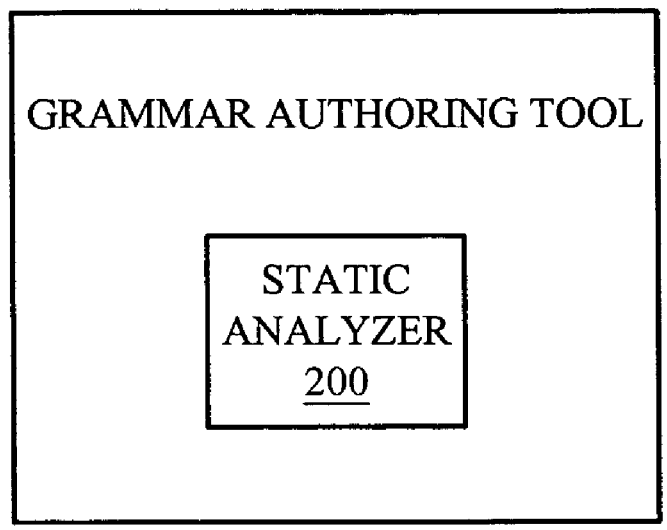
FIGS. 4A and 4B show a static analyzer in different context.
Figure 4B:
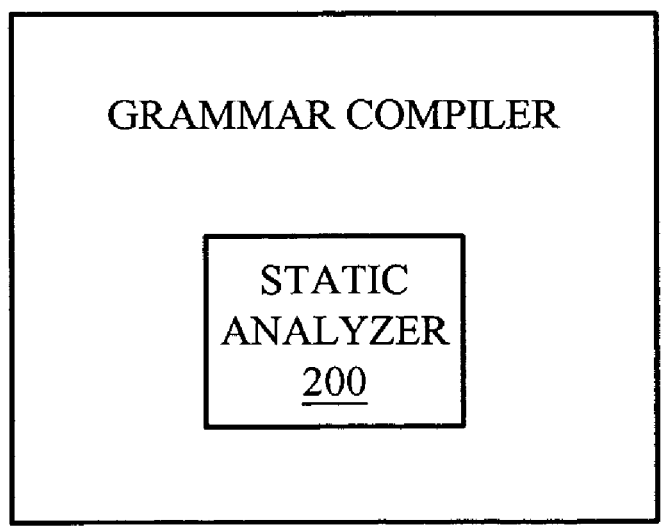

FIG. 4 is a block diagram showing one embodiment of static analyzer 202, defect identifier components 204 and static analysis tools 206 in more detail. FIG. 4 shows that static analyzer 202 includes load component 350, algorithm component 352 and defect scoring component 354. Load component 350 illustratively loads the defect identifier components or modules 204. Algorithm component 352 illustratively runs the algorithms embodied in defect identifier components 204, and defect scoring component 354 illustratively scores the identified defects and can provide a rank ordered list of the defects, ordered by score. The defect identifier components 204 shown in FIG. 4 include, for example, spell checker 356, grammar checker 358 and language model 360. Of course, these are simply examples of different defect identifier components (or modules) which can be used. It will also be noted that the system is scalable. In other words, additional or different defect identifier components 204 can be added, some can be removed or they can be changed, as desired.

The exemplary static analysis tool shown in FIG. 2 includes the internal grammar representation 362, a speech recognizer 364, a dictionary (or lexicon) 366, a frequently misspelled words database 368, and a thesaurus 370. Again, of course, these are illustrated by way of example only and other or different static analysis tools can be used as well.

Figure 5:
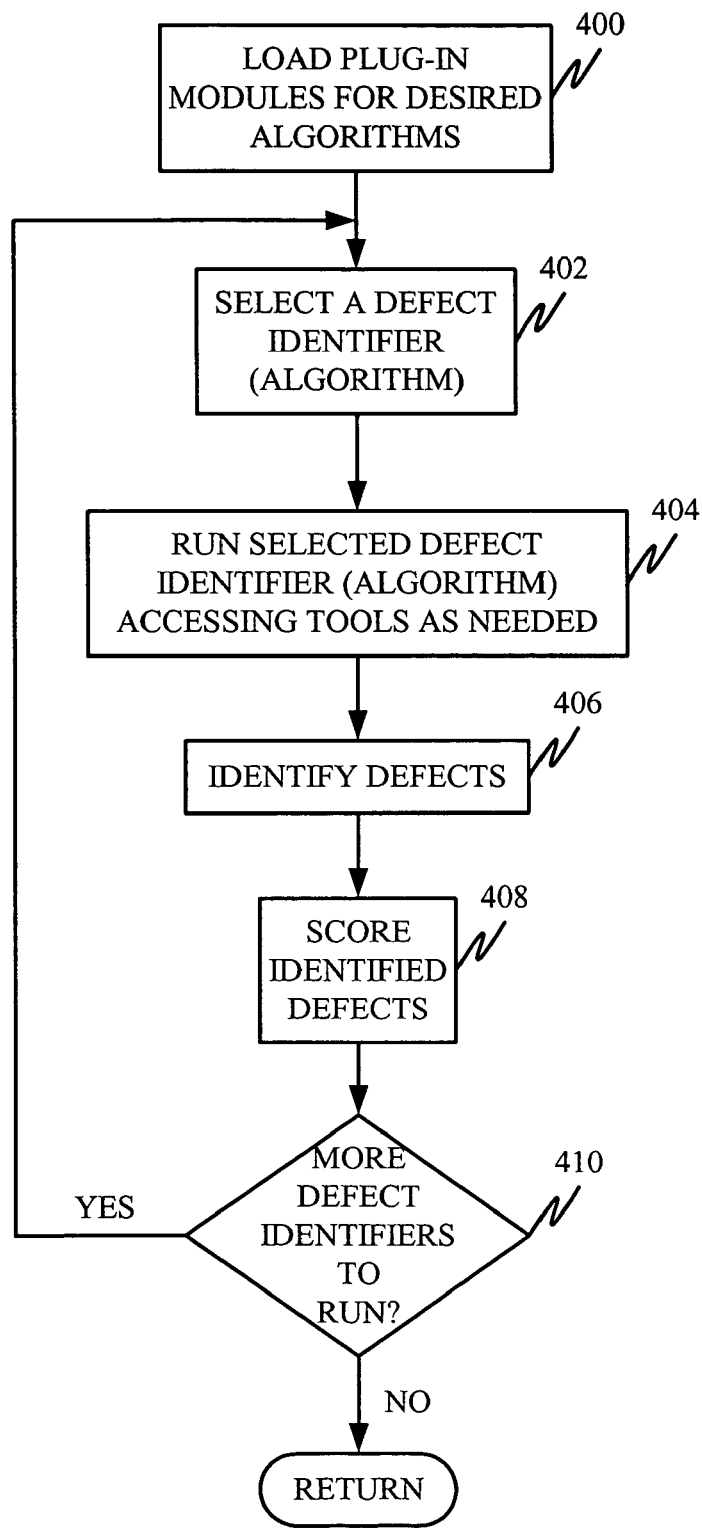
FIG. 5 is a flow diagram illustrating the operation of the static analyzer shown in FIG. 4.

FIG. 5 is a flow diagram illustrating the operation of the components shown in FIG. 4 in more detail. Load component 350 of static analyzer 204 first loads all the plug-in modules or defect identifier components 204 for each desired defect and analysis algorithm to be used by static analyzer 202. This is indicated by block 400 in FIG. 5. Algorithm component 352 then selects one of the loaded defect identifier components (or algorithms) to run on the grammar in order to identify a class of defects. This is indicated by block 402 in FIG. 5. Algorithm component 352 then runs the selected defect identifier 204, accessing any static analysis tools 206, that my be needed. This is indicated by block 404 in FIG. 5.

It should be noted that static analyzer 202 can load and run different defect identifiers 204 based on different circumstances. For instance, some defect identifiers may take a long time to run and require fairly heavy computational resources. In that case, those defect identifiers may only be run under certain special circumstances. Alternatively, all the available defect identifiers can be run, or only a pre-selected subset of them can be run, as desired.

In any case, the defect identifier components will identify various defects in the grammar. Identifying the defects is indicated by block 406 in FIG. 5. The various defects identified can be logged in defect logs or in other data structures, as desired.

It will be appreciated that not all defects may manifest as a runtime error. In addition, some defects may be more serious than others. For instance, some defects may result in failure, in that the grammar will not be loaded, or the grammar will crash the speech recognition system, or other speech-related systems with which the grammar is being used.

Other errors are less critical, but still problematic. For instance, some errors affect the accuracy of the speech system with which the grammar is being used. An example of one accuracy-related error includes acoustic confusability. The grammar may include two tokens that are so acoustically similar that the speech system with which they are used is likely to confuse the two and thus result in lower accuracy.

Yet other defects are simply performance-related defects. For instance, a grammar may include a very large number of tokens (such as names) where a relatively small number would suffice. In that case, the relatively large number of tokens increases the search space for the recognizer and results in a degradation in performance (manifested by an increase in the amount of time necessary to perform a recognition).

Still other defects may not even affect performance but may only be style-related defects. Some of these types of defects may, for instance, render the grammar more difficult to maintain or more difficult to read, but will not affect the accuracy or performance of the grammar, and will certainly not cause failure.

In order to present identified defects to the user in a meaningful way, the defects can illustratively be scored by defect scoring component 354. This is indicated by block 408 in FIG. 5. The particular way in which the score is calculated is not important for purposes of the present invention. By way of example, the score may be based on the severity of the result of the defect (such as whether the defect will cause failure, an accuracy problem, performance degradation, or is simply related to stylistic effects) and also based on how confident static analyzer is that it has actually identified a defect. Once the defects have been scored, static analyzer 202 determines whether there are any more defect identifiers 204 to run. This is indicated by block 410 in FIG. 5. If so, processing continues at block 402 where another defect identifier 204 is selected and run. If not, the present analysis of the grammar is completed.

Having identified a plurality of different defects, there are numerous prioritization strategies that can be used to reduce the cost associated with addressing the defects. Some strategies include categorizing defects in a defect report by severity, by warning type, or by confidence or by any combination of those or other criteria. Table 1 below illustrates one illustrative way of setting up the various severity categories to which defects can be assigned.

TABLE 1

Severity Categories

| Severity | Description |
|---|---|
| Failure | Internal tool error or grammar problem |
| Accuracy | Issues affecting optimal recognizer accuracy |
| Performance | Issues affecting optimal recognizer performance |
| Minor | Issues affecting style, readability ... |

Table 2 below shows one illustrative embodiment in which a plurality of different warnings are reported, along with the severity level, identification number and description corresponding to the warning.

TABLE 2

Warnings Detected

| Id | Severity | Name | Description |
|---|---|---|---|
| 0 | Failure | Invalid XML | Malformed grammar XML ... |
| 1 | Failure | Invalid grammar URL | Grammar file cannot be located at specified URL |
| 2 | Performance | Spelling mistake | Unknown word found in grammar |
| 3 | Minor | Lower case | Suggest to use upper case instead |

Table 3 below illustrates one exemplary embodiment in which a plurality of confidence levels are described.

TABLE 3

Confidence Levels

| Level | Description |
|---|---|
| Low | Low confidence, unlikely to be an error |
| ... | ... |
| High | High confidence, very likely an error that should be fixed |

Table 4 below gives one illustrative example of a defect report.

TABLE 4

Defect Report

| Severity | Confidence | Warning | Detail |
|---|---|---|---|
| Failure | High | Malformed XML | Unknown token 'X' |
| Performance | Low | Spelling mistake | Unknown word 'Craig' |
| Performance | Medium | Spelling mistake | Unknown word 'Micrsoft', did you mean 'Microsoft'? |
| Minor | High | Lower case | Suggest to use 'x' instead of 'X' |

It can be seen in table 4 that the exemplary defect report includes the severity level of each defect, a confidence score indicating how confident static analyzer 202 is that the item identified actually represents a defect, a warning message associated with the defect, and a detail column which provides additional detail as to what exactly is the cause of the defect. It will be noted that in some of the entries in the detail column, suggested fixes are also provided to address the defect. Also, as described above, once the defects have been identified, they can be corrected by updating the grammar using an automatic, a semi-automatic, or a manual process.

It should be noted, at this point that static analysis of the grammar can be used in a pre-deployment context. In that context, the static analysis can be integrated into the grammar authoring environment and can be periodically run while the grammar is being authored in order to alert the author to any potential defects which have been incorporated into the grammar.

Also, in the pre-deployment context, the static analysis can be used as an extension to basic grammar compiler operation. In that case, part or all of the static analysis can be performed as the grammar is being compiled.

In addition, in the pre-deployment context, the static analysis can be integrated into a speech recognizer grammar loading component. Thus, when the grammar is being loaded into the speech recognizer (or other speech related system) some or all of the static analysis can be performed at that time. This may be beneficial, for instance, because (as described in more detail below) some of the defect analysis may be directed to determining whether the grammar has been authored so that it can be represented in a way that is expected by a specific speech engine. Thus, if the static analysis is integrated into the speech recognizer grammar loading algorithm, that algorithm will likely know the specific speech recognizer being used with the grammar. Thus, the static analysis can more easily point out defects which may arise as a result of the grammar being used with the specific speech recognizer (or other speech-related engine).

The static analysis of the present invention can also be incorporated at the deployment phase. It can be used to enhance the troubleshooting capability of the system once it is deployed, and it can also be integrated into on-line tuning of the grammar. In other words, once the grammar has been deployed, and certain errors have been identified by users, the static analyzer 202 can be used to identify the defects in the grammar which result in those errors. The grammar can then more quickly and easily be tuned to minimize or remove the defects that lead to the identified errors.

While a wide variety of defect identifier components (or algorithms) 204 can be employed in the present invention, a number of them will be discussed in more detail for the sake of example. The first is a defect identifier 204 that identifies grammar errors that can lead to runtime failure or incorrect operation based on syntax and inconsistency.

As mentioned in the background section, the W3C has set out one standard format for grammars. Therefore, in one embodiment of a defect identifier component 204 that identifies syntax and consistency errors, static analyzer 202 invokes a defect identifier component 204 that performs a static analysis of the grammar to flag invalid W3C grammars, and to provide a detailed analysis of the type of errors and examples illustrating how to fix the errors. Of course, the W3C standard is only one exemplary standard and the invention is equally applicable to measuring conformance to any other standard as well.

Also, even some valid W3C grammars (or valid grammars that conform to another standard) may not be able to be used with certain speech recognition engines. For instance, if a grammar is built for the English language, it may well be unsuitable for use with a French speech recognition engine. Normally, such errors would be seen at runtime, but, static analyzer 202 detects them prior to runtime and provides a detailed description of how to remedy them. This results in savings in terms of time and resources needed to deploy a correct grammar.

If any of these types of errors are identified, they are flagged and explained, and a suggestion may be made as to how to fix them. All of these types of errors would normally be identified only at runtime, but by simply examining the syntax and the other characteristics of the grammar (such as whether there is a mismatch between the language identifier of the engine of the grammar and between the grammar and external references) static analyzer 202 can illustratively identify many of these defects prior to deployment.

Another type of exemplary syntax and consistency error involves rule consistency. One illustrative defect identifier component 204 performs a static analysis on the grammar to verify whether all the external rules can be resolved, and the corresponding grammars loaded. The static analysis can also determine whether there are public rules in the grammar so, that it will be usable once deployed.

A third type of exemplary syntax and consistency error involves targeted deployments. Depending upon the speech engine in the deployment where the grammar is to be used, there may be certain recommendations to avoid the problems associated with that specific speech engine. For instance, the defect identifier can be configured to know that the grammar is close to the maximum size allowed by an engine for a grammar, or that the grammar is close to the maximum number of items that need a certain type of process by the engine. This can save a large amount of time in identifying errors associated with the grammar exceeding engine limits.

This defect identifier component 204 can also be useful when planning how to extend a certain grammar. For instance, assume that a speech-related engine has an upper limit on the number of names which can be recognized of 70,000. Also assume that the grammar under analysis (which has been authored to work with that engine) has over 70,000 names. Static analyzer 206 can identify that the number of names in the grammar exceed the limits of the engine, and thus provide a description of that defect and a proposed remedy (such as reducing the total number of names in the grammar).

Of course, this discussion of syntax and consistency errors is exemplary only and a wide variety of other defect identifier components can be used to identify other types of syntax and consistency errors as well.

A second group of errors which can be identified by static analyzer 202 (using defect identifier components 204) are errors or defects related to spelling and pronunciation specified in the grammar. These errors are associated with a written form of the words that represent the options for the different rules in the grammar. In one embodiment, three main sets of defects can be identified: incorrect explicit pronunciations, spelling errors, and expressions that need to be processed internally to reach the state when they can be spoken.

Figure 6:
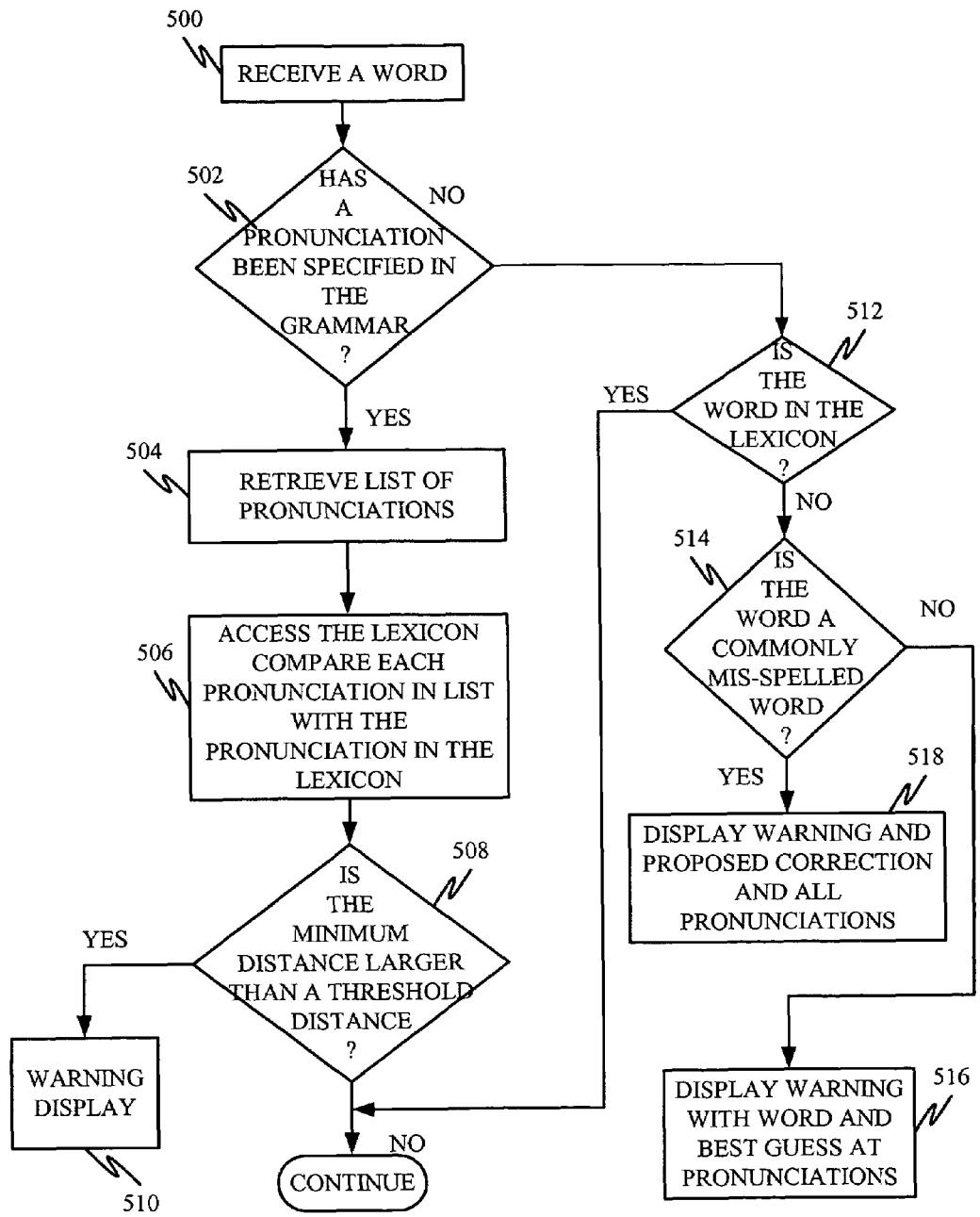
FIG. 6 is a flow diagram illustrating the operation of one illustrative defect identifier component in which spelling and pronunciation errors are identified.

FIG. 6 is a flow diagram illustrating one embodiment in which a number of checks are performed by a defect identifier component 204, run by static analyzer 202, to identify spelling and pronunciation errors. It will be described in conjunction with FIG. 4. First, the static analyzer 202 receives a word from the grammar under analysis (which has already been loaded by load component 350). This is indicated by block 500 in FIG. 6. Next, the static analyzer 202 (running a defect identifier component in algorithm component 352) determines whether a pronunciation for the word has been specified in the grammar. This is indicated by block 502. If so, then all of the pronunciations specified in the grammar, for that word, are retrieved. This is indicated by block 504. There may be multiple pronunciations for a given word, because some grammars allow the author to specify alternative pronunciations for a given word.

Once the list of pronunciations have been retrieved, the static analyzer 202 accesses dictionary or lexicon 366 and compares each pronunciation in the retrieved list (retrieved from the grammar) with the pronunciation in the lexicon 366, for the word being considered. This is indicated by block 506 in FIG. 6.

If the minimum distance between the specified pronunciations (specified in the grammar) and the pronunciation(s) found in the lexicon 366 is larger than a predetermined threshold distance, then a warning is displayed. This is indicated by blocks 508 and 510 in FIG. 6. The reason for the warning is that if the proposed pronunciation in the grammar is relatively far from the pronunciation set out in the lexicon 366, then either an error in the word or an error in the pronunciation has likely been made by the author of the grammar.

If, at block 502, it is determined that a pronunciation has not been specified in the grammar for the input word, then the static analyzer checks to determine whether the input word is in the lexicon 366. This is indicated by block 512. If so, then processing is finished with respect to that word because the spelling is believed to be correct since the word was found in the lexicon, and no pronunciation is specified for comparison.

If the word is not found in the lexicon 366, however, then that means that the input word neither has a pronunciation specified nor is it found in the lexicon 366. Therefore, it may well be a misspelled word. Thus, the static analyzer 202 accesses a frequently misspelled word database 368 and determines whether the input word is located in that database. This is indicated by block 514. If not, a warning is simply displayed that specifies the input word and the best guess as to the pronunciation for that input word. This is indicated by block 516.

If, on the other hand, the word is found in the frequently misspelled word database 368, then a warning is displayed indicating that the word is likely misspelled, along with its proposed correction. This is indicated by block 518 in FIG. 6.

The static analyzer 202 may perform additional checks in determining whether spelling and pronunciation errors have occurred. For instance, such checks may be related to the need of processing the written form of the word into something that can be spoken. One example of this type of error is the existence of punctuation at the end of a word in the grammar, where none was intended. Such an example may include "ACME." Which will actually be pronounced "ACMEperiod". Of course, it is unlikely that this was intended by the author. In a similar way, numerals can be dealt with. The numeral "2", for instance, written in the grammar will be converted to "two". These items can all be flagged and identified to the user by the static analyzer 202.

In addition, the static analyzer 202 can employ language model information and dictionary information in the static analysis for correction and tuning of speech grammars. In some previous systems, parts of the grammar that were used for generation of semantic results were not normally tested until deployment (or at least until test deployment) of the system. However, the present static analyzer allows this part of the grammar to be tested and debugged at design time.

Another type of error that can be identified using static analysis relates generally to accuracy and performance degradation. One exemplary error is referred to as an over-generation error. Over-generation can occur when an author adds large numbers of rules to the grammar to cover various possibilities of inputs anticipated by a user. However, in typical grammars, rules refer to other rules so as the number of rules grows, the actual complexity of the grammar grows much more quickly. Thus, many rules will apply to any given input. When the number of rules that apply to a given input is undesirably large, this is referred to as over-generation.

The problem of over-generation, however, is very difficult to identify. The reason is that if a grammar has been subjected to over-generation, the result is likely a mis-recognition (so over-generation often simply looks like an accuracy problem with the grammar or the speech recognizer) or the speech system simply operates very slowly, (which is a performance problem). The performance degrades because of the large number of rules in the grammar that are firing for any given input. The result is that the recognition search space is too big and therefore the speech system becomes less accurate and slower.

Figure 7:
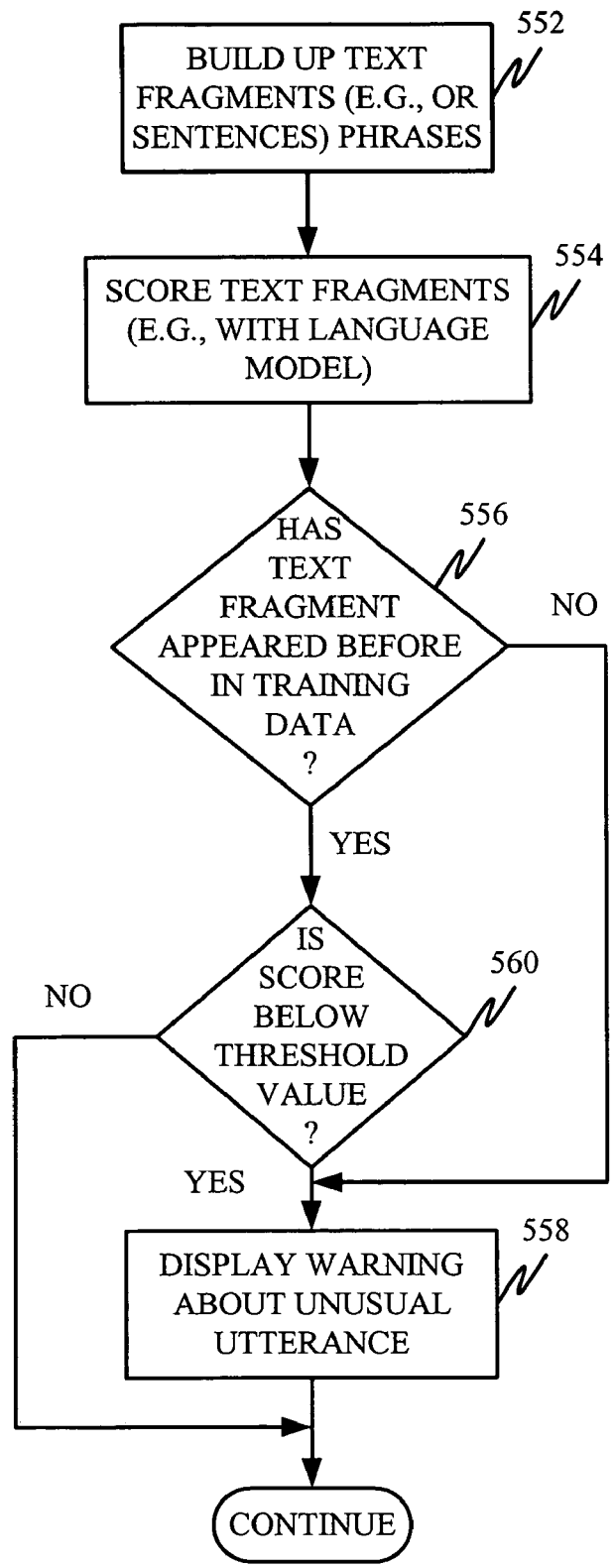
FIG. 7 is a flow diagram illustrating the operation of one illustrative defect identifier component in which over generation is identified.

FIG. 7 is a flow diagram illustrating one embodiment in which the static analyzer 202 detects over-generation. This will, of course, illustratively be performed by a defect identifier component 204 (loaded into component 352) that is configured to detect over-generation. The particular detection of over-generation basically determines whether the grammar is allowing certain constructs that would not likely be used by a user of the speech system in which the grammar is used.

Therefore, the static analyzer 202 first walks through the grammar under analysis building up parseable text fragments (such as phrases or sentences). This is indicated by block 552 in FIG. 7.

Once the text fragments have been built up, they are scored with, for example, language model 360. This is indicated by block 554. In one illustrative embodiment, once a word is identified in the grammar it is scored using a uni-gram language model. Once two words are identified they are scored using a bi-gram language model, and once three words are identified, and thereafter, the input is scored using a tri-gram language model. Of course, this is simply one exemplary language model construction and any other desired language model construction could be used as well.

The static analyzer 202 then illustratively asks two questions. First, it asks whether this particular text fragment has appeared before in the training data, based on the results output by the language model 360. This is indicated by block 556. If this text fragment has not appeared before in the training data, then a warning is displayed indicating that this is likely a very unusual utterance and may be eliminated from the grammar. This is indicated by block 558.

If, at block 556 it is determined that the text fragment has been observed in the training data, then the static analyzer 202 determines how likely the text fragment is to be used by the user. In doing this, the static analyzer 202 determines whether the language model score (which indicates how likely it is that this text fragment will be used) is below a threshold value. This is indicated by block 560 in FIG. 7. If the score is below a threshold value, that indicates that the text fragment is not very likely, and the warning message is again displayed. However, if the language model score is above the threshold value, then no warning message is displayed, as the text fragment is suitable for the grammar.

The present invention may also deploy a moving threshold. For instance, if the static analyzer 202 is analyzing a portion of the grammar that lists proper names, they typically do not score highly when scored by a language model 360. Therefore, the static analyzer 202 may determine that a large number of consecutive grammar entries all fall below the threshold language model score. The static analyzer 202 may then automatically adjust the threshold downwardly, assuming that it is looking at an area of the grammar which customarily has low language model scores. In that case, in one embodiment, the static analyzer 202 may only choose to display the very worst scoring entries to the author in the warning messages. Of course, the sliding threshold can illustratively be set and selected or deselected by the author as well. Therefore, if the author does not wish for the static analyzer 202 to automatically adjust the threshold, that feature can be deselected by the author or the threshold can be manually set by the author.

Figure 8:
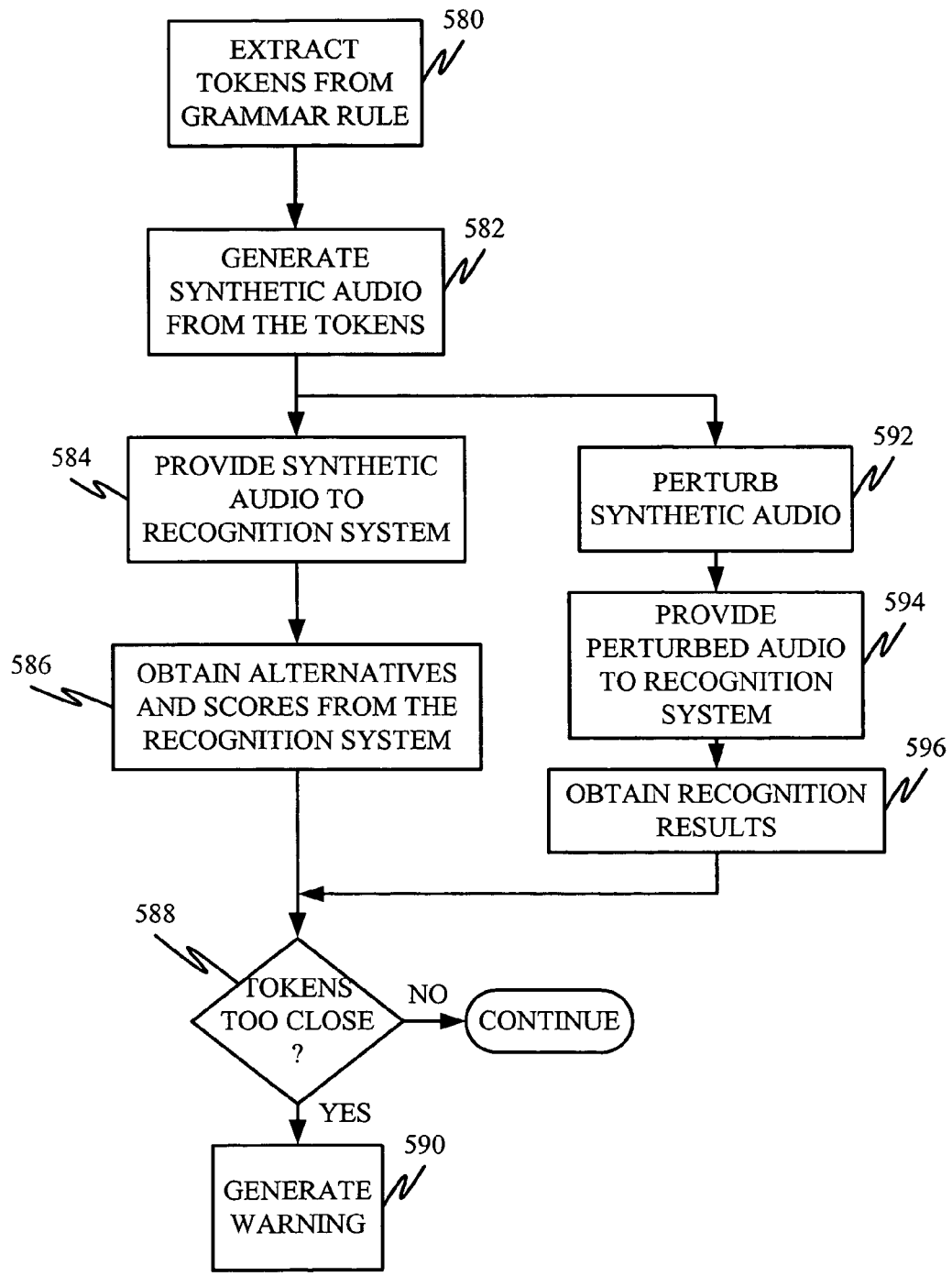
FIG. 8 is a flow diagram illustrating the operation of one illustrative defect identifier component in which acoustic confusability is identified.

Another problem related to accuracy and performance degradation is acoustic confusability. Acoustic confusability occurs when two entries in the grammar are acoustically so similar that the speech related engine with which the grammar is to be deployed will likely confuse the two entries. For instance, assume that the grammar contains a list of proper names that include both "John Smith" and "Jonah Smith". These two entries may be so close that a speech recognition engine will have trouble distinguishing between the two. Therefore, one defect identifier component 204 that can be used by static analyzer 202 can be configured to perform a check to look for acoustic confusability within the grammar. FIG. 8 is a flow diagram illustrating one way in which this can be done.

First, the static analyzer 202 extracts tokens from a grammar rule. This is indicated by block 580 in FIG. 8. The static analyzer 202 then subjects the tokens to a system which provides synthetic audio information associated with the tokens. In one embodiment, a generative acoustic model is used (the acoustic model may be one of tools 206). In another embodiment, text-to-speech synthesis (a TTS synthesizer may be one of static analysis tools 206) generates synthetic audio associated with the tokens. This is indicated by block 582 in FIG. 8. Then, static analyzer 202 can illustratively perform either or both of two different processing techniques, one involving obtaining alternates from a speech recognition system and another involving perturbation of the synthetic audio. Of course, other techniques can be used as well and these two are exemplary only.

In accordance with the first technique, the static analyzer 202 provides the synthetic audio to the recognition system 364. This is indicated by block 584 in FIG. 8. Speech recognition engines conventionally can be configured to provide alternates instead of just a single result of a speech recognition. In accordance with one embodiment of the present invention, the static analyzer 202 not only asks for the most likely speech recognition results, but also for alternates. Speech recognition engines also typically provide a confidence score associated with the results and the alternates. Therefore, in accordance with one embodiment of the present invention, the static analyzer 202 obtains the alternates from the speech recognizer 364 along with the confidence scores and determines whether the alternates have a confidence score which is within a predetermined threshold of the confidence score for the most likely speech recognition results returned by the recognition system 364. This is indicated by block 586 in FIG. 8.

If so, then the static analyzer 202 determines that the tokens are too close to one another acoustically. In other words, the most likely speech recognition result and the alternate will both represent tokens in the grammar and may likely be confused during use of the grammar. Determining whether the tokens are too close is indicated by block 588 in FIG. 8.

If the tokens are determined to be too close, the static analyzer 202 generates a warning indicating that the two tokens are acoustically too similar to one another. This is indicated by block 590 in FIG. 8.

In accordance with another embodiment, after the synthetic audio is generated for the tokens, the synthetic audio is perturbed slightly. This is indicated by block 592 in FIG. 8. The perturbation introduced in the synthetic audio is then provided to the speech recognition system 364. This is indicated by block 594 in FIG. 8. The recognition results are obtained as indicated by block 596, and again, based on those results, static analyzer 202 determines whether the tokens are acoustically confusable.

In other words, the synthetic audio for a token, once perturbed, may be recognized as a different token by the recognition system 364. The perturbation will illustratively be similar to that encountered by a variety of different users of the speech recognition system 364. Therefore, if the token can be so easily confused with another token by the speech recognition system 364 (with such a small perturbation) it will likely be confused during actual use of the grammar in the speech recognition system, and again a warning is generated to the author. Of course, the degree of confusability may illustratively be set as desired by the author.

Early detection of the acoustically confusable terms allows a speech developer to either control the growth of the grammar, to select less confusable terms if possible or to design mechanisms to mitigate the problem. All this can be done prior to deployment.

Another problem that relates to performance degradation involves the use of semantic tags. One example of this type of problem is as set out in Table 5 below.

TABLE 5

```
<grammar>
    <rule id="Names">
        <one-of>
            <item>
                John
                <tag>$.Value='John'</tag>
            </item>
            <item>
                Jon
                <tag>$.Value='Jon'</tag>
            </item>
            ... Other names omitted...
        </one-of>
    </rule>
</grammar>
```

Table 5 shows that the grammar accepts either "John" or "Jon" and returns a variable to the application indicating which one was spoken. However, these tokens are acoustically identical and it is very unlikely that a speech system can distinguish between them. One might find that, in a grammar that employs these tokens, one of the values is never recognized. By examining the acoustic confusability of the tokens, static analyzer 202 can identify this problem prior to deployment. The static analyzer then may recommend an improved grammar such as that set out in Table 6 below.

TABLE 6

```
<grammar>
    <rule id="Names">
        <one-of>
            <item>
                <one-of>
                    <item>Jon</item>
                    <item>John</item>
                    <tag>$.Value='John'</tag>
                </one-of>
            </item>
            ... Other names omitted...
        </one-of>
    </rule>
</grammar>
```

Still other types of static analysis can be performed to enhance to performance of a recognition system employing a grammar. For instance, the static analyzer can be employed to detect patterns in the grammar that will cause suboptimal performance. Examples of these types of patterns are possible infinite paths through the grammar. Paths that are too long when compared to a threshold, external rule references not being compiled, duplicated paths through the grammar, or excessive initial fan out. Of course, a wide variety of other or different types of errors can be detected as well, and these are only examples of defect identifier components that can be employed by the static analyzer 202.

It can thus be seen that the present invention provides a static analyzer which can be used to identify syntax and consistency errors, spelling and pronunciation errors, semantic results generation errors, over-generation errors, acoustic confusability errors, and other performance degradation errors, to name but a few. These errors can all be identified in the pre-deployment context which significantly reduces the overhead and time required to fix the grammar. They can also be identified post-deployment in order to perform advanced error troubleshooting. Similarly, the present invention can be used to enforce style best practices and to regulate grammar writing best practices and recommendations.

Although the present invention has been described with reference to particular embodiments, workers skilled in the art will recognize that changes may be made in form and detail without departing from the spirit and scope of the invention.

What is claimed is:

1. A method of analyzing a context free grammar for a speech system during authoring of the context free grammar, comprising:
   authoring at least a portion of the context free grammar;
   loading the authored context free grammar into a grammar analyzer having a plurality of static analysis components each capable of identifying a different class of grammar defects, wherein at least one of the classes is related to identifying defects related to speech recognition and at least one of the classes is related to identifying defects related to something other than speech recognition;
   intermittently, while authoring the context free grammar, selecting one of the plurality of accessible static analysis components;
   running the selected static analysis component on the context free grammar to identify specific defects in the context free grammar of the class associated with the selected static analysis component wherein the selected static analysis component identifies over-generation defects in the context free grammar by selecting each text fragment allowed by the context free grammar, calculating a language model score for the selected text fragment with a language model to determine whether the selected text fragment is likely to be used by a user based on the language model score; and
   if not, generating an output indicative of a possibility that an unusual text fragment, allowed by the context free grammar, has been identified; and
   repeating the steps of selecting and running for each desired static analysis component.

2. The method of claim 1 wherein determining whether the text fragment is likely to be used comprises:
   parsing an input with the context free grammar to build the text fragment; and
   calculating the score for the built text fragment using the language model.

3. The method of claim 2 wherein determining whether the text fragment is likely to be used further comprises:
   comparing the score to a threshold value; and
   wherein the step of generating an output indicative of a possibility that an unusual text fragment, allowed by the context free grammar, has been identified if the score does not meet the threshold value.

4. The method of claim 1 wherein the selected static analysis component identifies acoustically confusable tokens in the context free grammar.

5. The method of claim 4 wherein identifying acoustically confusable tokens comprises:
   identifying a token in the context free grammar;
   generating synthetic audio information indicative of a pronunciation of the identified token; and
   determining whether the synthetic audio information is acoustically confusable with acoustic information corresponding to other tokens in the context free grammar.

6. The method of claim 5 wherein determining whether the synthetic audio information is acoustically confusable with acoustic information corresponding to other tokens in the context free grammar comprises:
   performing speech recognition on the synthetic audio information to obtain a speech recognition result that includes a best speech recognition result and one or more alternate speech recognition results; and determining whether the best speech recognition result is too close to the one or more alternate speech recognition results.

7. The method of claim 5 wherein determining whether the synthetic audio information is acoustically confusable with acoustic information corresponding to other tokens in the context free grammar comprises:

perturbing the synthetic audio information;

performing speech recognition on the perturbed audio information to obtain a speech recognition result; and determining whether the synthetic audio information is acoustically confusable with acoustic information corresponding to other tokens in the context free grammar based on the speech recognition result.

8. The method of claim 1 wherein the selected static analysis component identifies spelling and pronunciation defects in the context free grammar.

9. The method of claim 8 wherein identifying spelling and pronunciation defects comprises:

identifying a word in the context free grammar; and accessing a lexicon with words and corresponding pronunciations; and determining whether the identified word is misspelled or has an incorrect pronunciation based on the lexicon.

10. The method of claim 9 wherein determining whether the identified word is misspelled or has an incorrect pronunciation comprises:

if the word in the context free grammar has a pronunciation specified in the context free grammar, then comparing the specified pronunciation to a pronunciation in the lexicon corresponding to the word; and if the distance between the specified pronunciation and the pronunciation in the lexicon meets a threshold distance, then providing an indication that the spelling or pronunciation may be in error.

11. The method of claim 9 wherein determining whether the identified word is misspelled or has an incorrect pronunciation comprises:

if the word in the context free grammar does not have a pronunciation specified in the context free grammar, then determining whether the word is in the lexicon; and if the word is not in the lexicon, then providing an indication that the spelling of the word may be in error.

12. The method of claim 11 wherein providing an indication that the spelling of the word may be in error comprises:

determining whether the word is in a frequently misspelled words data store; and if the word is in the frequently misspelled words data store, then providing a suggested correct spelling from the frequently misspelled words data store.

13. A static analyzer that includes a processor capable of executing instructions for analyzing a speech context free grammar, comprising:

an authoring component used to author the context free grammar, including an analysis component performing static analysis on the context free grammar by executing instructions in the processor for selecting one or more defect identifying components, with at least one of the defect identifying components being related to speech recognition defects and at least one of the defect identifying components being related to something other than speech recognition components and running the selected defect identifying components on the context free grammar to identify specific defects in the context free grammar, wherein the defect identifying components include a syntax error identifying component that identifies syntax errors in the context free grammar, the syntax errors including an external grammar defect identified when the syntax error identifying component determines that references, in the context free grammar, to external rules cannot be resolved or that the external rules cannot be loaded into the analysis component; and wherein the defect identifying components comprise a specific engine defect identifier identifying whether the context free grammar violates engine specific limits for a plurality of different speech recognition engines, each of the engine specific limits corresponding to one of the plurality of different speech recognition engines.

14. The static analyzer of claim 13 wherein the defect identifying components comprise an over-generation defect identifier identifying over-generation in the context free grammar by determining whether text fragments allowed by the context free grammar are infrequently used text fragments.

15. The static analyzer of claim 13 wherein the defect identifying components comprise an acoustic defect identifier identifying whether tokens in the context free grammar are undesirably acoustically similar to one another based on synthetic audio information generated for at least one of the tokens.

16. The static analyzer of claim 13 wherein the defect identifying components comprise a spelling and pronunciation defect identifier identifying spelling and pronunciation defects in the context free grammar by accessing information in a lexicon to determine whether the information in the context free grammar is similar to the information in the lexicon.

* * * * *